Dec. 12, 1961 J. D. LEWIS 3,012,273
METHOD OF AND APPARATUS FOR ENCAPSULATING AN ARTICLE
Filed March 9, 1959 2 Sheets-Sheet 1
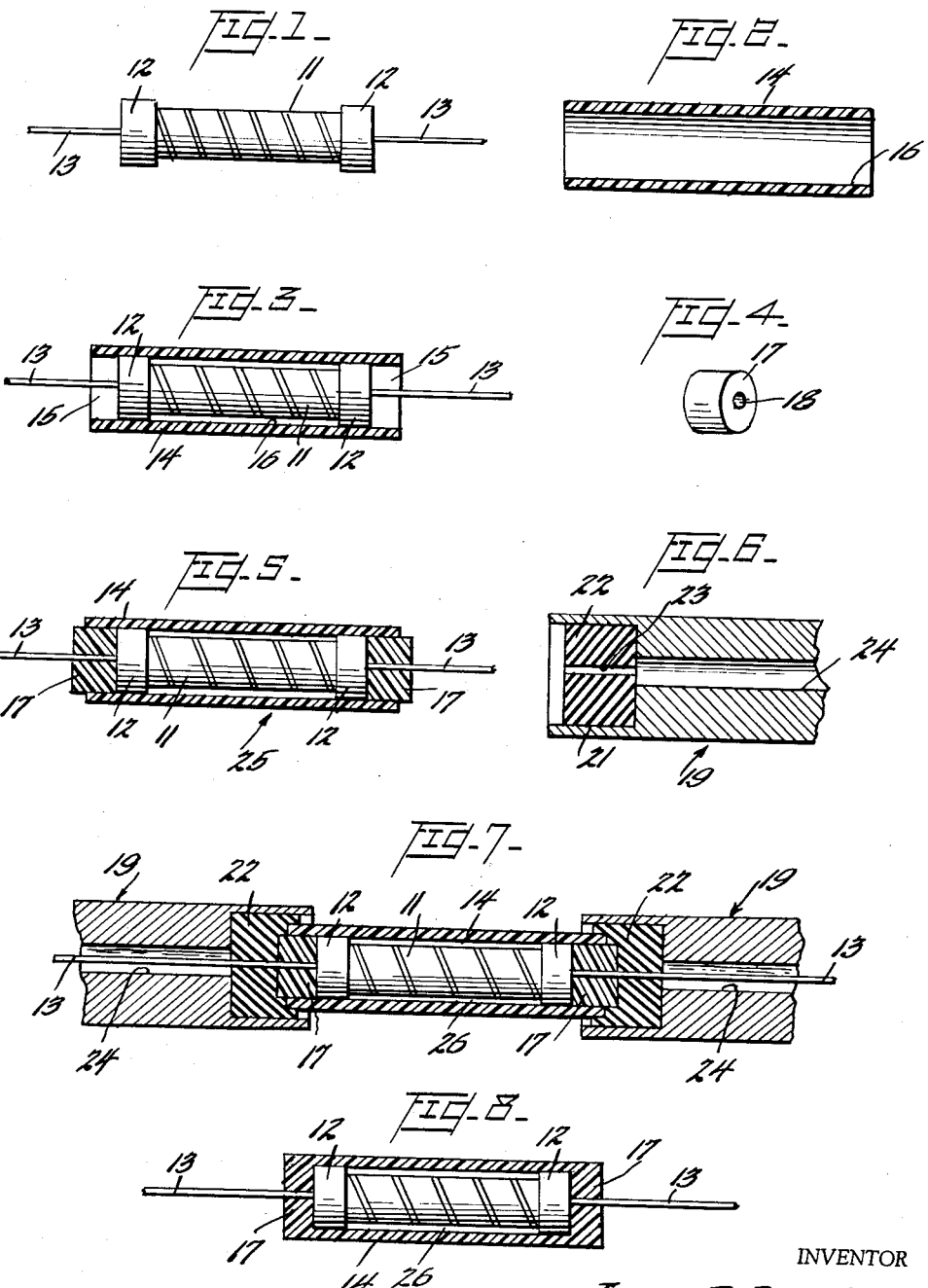
INVENTOR
Jerry D. Lewis
BY
C. B. Hamilton
ATTORNEY Dec. 12, 1961     J. D. LEWIS     3,012,273
METHOD OF AND APPARATUS FOR ENCAPSULATING AN ARTICLE
Filed March 9, 1959     2 Sheets-Sheet 2
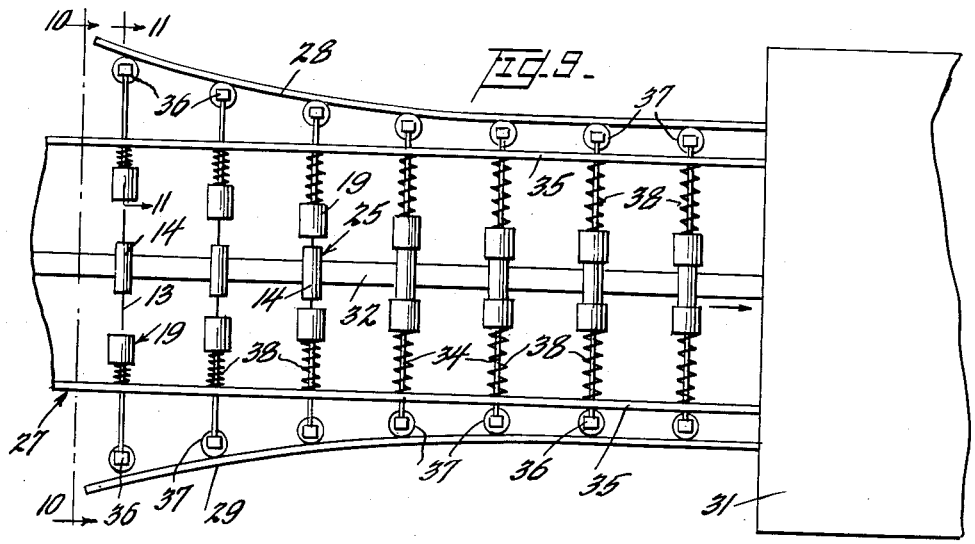
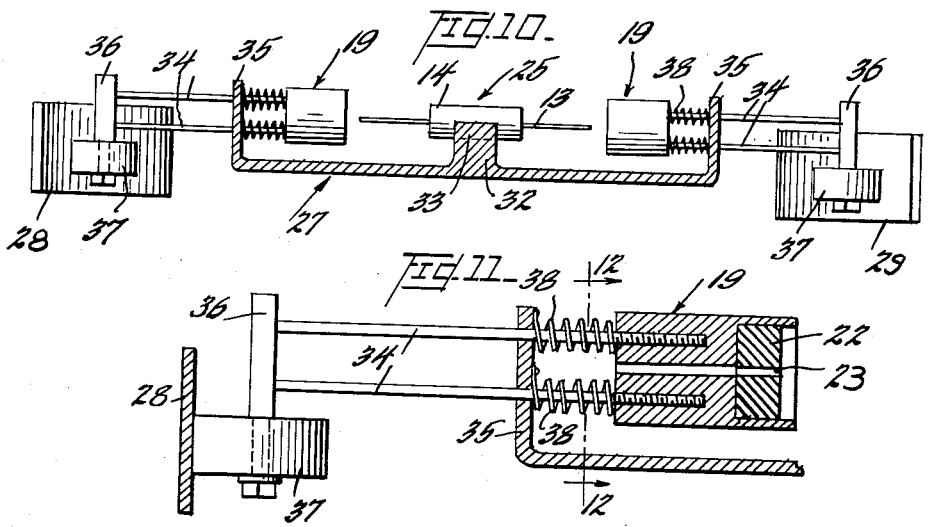
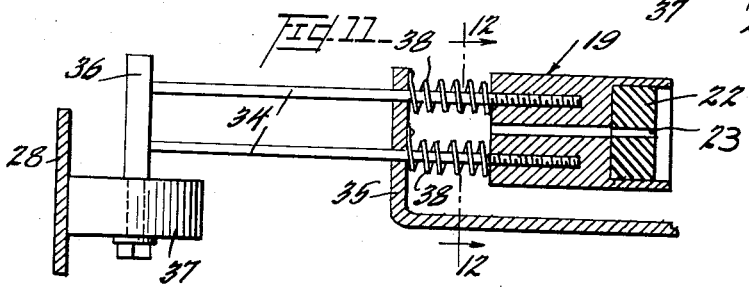
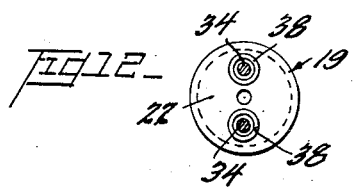
INVENTOR
*Jerry D. Lewis*
BY *C. B. Hamilton*
ATTORNEY

United States Patent Office 3,012,273
Patented Dec. 12, 1961

3,012,273
METHOD OF AND APPARATUS FOR ENCAPSULATING AN ARTICLE
Jerry D. Lewis, Winston-Salem, N.C., assignor to Western Electric Company, Incorporated, New York, N.Y., a corporation of New York
Filed Mar. 9, 1959, Ser. No. 797,913
3 Claims. (Cl. 18—4)

This invention relates to a method of and apparatus for encapsulating an article such as a carbon deposited resistor.

Resistors and other electrical articles commonly are used under diversified environmental conditions, and to prevent their failure because of deterioration due to exposure to air, moisture, and mechanical damage these articles should be enclosed, for example, within a tubular shell sealed at both ends. In many instances the material of the end closures for the cylindrical shell does not bond satisfactorily to the shell or to leads of articles to be encapsulated which protrude through the closures.

An object of the present invention is to provide a new and improved encapsulated article.

Another object of the invention is to provide a new and improved method of encapsulating articles.

A further object of the invention is the provision of a new and improved apparatus for encapsulating an article.

Still another object of the invention is to provide a method of an apparatus for positive sealing of articles within a shell such that gases within the shell which expand in volume during the process of sealing do not render the seals imperfect.

A method illustrating certain features of this invention includes inserting an article into a shell and placing closures within each end of the shell. Pressure is brought against the closures and the shell toward the center of the shell to air seal the article within the shell; subsequently, the closures are fused to the shell, forming an encapsulation. The pressure exerted to air seal the closures and the shell counteracts the pressure of gases expanding within the encapsulation. The opposing pressures also compress the fusible material of the closures during the fusing operation to form a dense homogeneous mass impervious to the expanding gases and external air.

An apparatus for encapsulating articles illustrating certain features of the invention may include chucks having resilient faces for creating pressure contact with encapsulation material surrounding an article, and a mechanism for feeding the material and the article into engagement with the chucks whereby the chucks air seal the article within the material preliminary to permanent heat sealing of the material about the article.

An article of manufacture illustrating certain features of this invention may include an article with leads attached thereto held freely within an encapsulating shell by engagement of the leads of the component with end closures of the shell, the closures being sealed to the article leads and to the encapsulating shell.

A complete understanding of the invention may be had from the following detailed description of a specific embodiment thereof when read in conjunction with the appended drawings, in which:

FIG. 1 is a plan view of a resistor susceptible to encapsulation by the teachings of the present invention;

FIG. 2 is a longitudinal cross section of a tubular shell which forms an element of the encapsulation;

FIG. 3 is a sectional view of the resistor of FIG. 1 positioned within the cross section of the tubular shell as shown in FIG. 2;

FIG. 4 is a perspective view of an end closure with an axial aperture;

FIG. 5 shows a resistor, shell, and closures in an unsealed condition;

FIG. 6 is a cross-sectional fragmentary view of a chuck with a resilient pad seated in a recess of the chuck;

FIG. 7 is a sectional view of the arrangement of elements of FIG. 5 held between chucks, as shown in FIG. 6, preparatory to a sealing operation;

FIG. 8 shows a completed encapsulated product;

FIG. 9 is a plan view of apparatus for preparing articles for encapsulation;

FIG. 10 is a sectional view taken along line 10—10 of FIG. 9;

FIG. 11 is a section taken along line 11—11 of FIG. 9; and

FIG. 12 is a view of the chuck and supporting rods taken along line 12—12 of FIG. 11.

Referring now to the drawings, wherein like reference characters designate like or corresponding parts throughout the several views, there is shown in FIG. 1 an artcile 11, such as a resistor, which is provided at each end with terminal caps 12 and leads 13 attached thereto. The article 11 is inserted by convenient means, not shown, into a tubular encapsulating shell 14, preferably composed of thermosetting plastic material. The shell is of greater length than the article 11 and extends beyond caps 12 to form cavities 15, and it preferably has an inner diameter only slightly greater than the caps 12 so that the inner wall 16 of the shell 14 is in contact with the caps 12 to support the article 11 within the shell 14.

The characteristics of the preferred material of the shell 14 are a high dielectric strength, and imperviousness to liquids, moisture, vapors, and gases. Also, the material has a softening flow point above the maximum temperature extremes to which the encapsulated article is exposed, or at least above 150° F. More specifically, the shell 14 is a thermosetting resin, such as those of the epoxy resin group; for example, a tubular shell of "Molded Epoxy Resin No. 105," sold by Epoxy Products, Incorporated, has been found to give excellent results. Other resins suitable for practice of the invention are the vinyl, phenolic, resorcinol, furan, urea, melamine, polystyrene, and polyacrylic ester resins.

An end closure 17, best shown in FIGS. 4 and 5, having an axially extending aperture 18, is inserted over each lead 13 into cavities 15 of the shell 14 (FIG. 3). The closure 17 may be of the same material as the shell 14 to cure or to fuse therewith, and is of sufficient size and volume to seal, upon melting during a curing or fusing process, the end cavities 15.

The closures 17 are of a material which has the capability to harden quickly during curing to form a thermosetting compound without the evolution of water or volatile matter, and having adhesive properties with metal and plastic. Typical examples of such materials are the epoxy resins, since they have the ability to effect bonding of the closures 17 to the shell 14 and leads 13. A specific example of a suitable material is "Modified Epoxy Resin No. 505–G–069," sold by Epoxy Products, Incorporated. This particular resin has a curing temperature range of 300–360° F. with a curing time of fifteen to thirty minutes. Of course, other plastic materials having similar physical properties and molding capabilities may be used, and the curing temperatures and times correspond to the qualities and abilities of the chosen plastic material.

An elastomer-faced chuck having a cylindrical elongated body 19 with a counterbore 21 in one end thereof is shown in FIG. 6. A pad 22 of resilient material is fitted into the counterbore 21 of the body 19. The pad has an axially extending passage 23 formed coaxially with a bore 24 of the body 19 within which are received leads 13.

In FIG. 9 the article 11, shell 14, and closures 17 are shown arranged to form an assembly, designated generally as numeral 25, FIG. 5, which is placed between the chucks 19 with leads 13 received within passages 23. Axial pressure is applied against the closures 17 in a direction toward the center of the assembly 25 by the chucks 19. The closures 17 are forced into a snug fit with the caps 12 of the article 11, and when the chucks 19 reach positions shown in FIG. 7, the resilient pads 22 envelop and air seal the ends of the shell 14 to the closures 17, and the closures 17 to the leads 13.

To encapsulate the article 11, the chucks 19 and the assembly 25 are heated by conventional means, such as a furnace, to effect fusing or curing of the material of the closures 17 with the material of the shell 14. The heat also cures the material of the closures 17 about the leads 13.

During the heating stage of encapsulation of the article 11, entrapped gases expand within a space 26 which exists between the shell 14 and the article creating a pressure which may breach the seals of the encapsulation. The closures 17 in the softening stage of curing offer little resistance to the pressure of expanding gases entrapped within space 26; however, the inwardly directed pressure of chucks 19 counteracts the pressure of the expanding gases, which pressure is directed outwardly, preventing rupture of the seals and the closures 17. The resilient pads 22 envelop the ends of the shell 14 and closures 17 to prevent escape of the expanding gases within the assembly 25. Also, the resilient pads 22 will firmly seal by elastic deformation the passages 23 about the leads 13. Also, as the temperature is raised during an encapsulating process, the resilient pads 22 of a heat resistant material such as a silicone rubber expand and efficiently seal the passages 23 around the electrode leads 13. The pressure exerted by the chucks 19 will compact the closures 17 into dense homogeneous masses to prevent formation of leakage paths through the closures.

An apparatus for bringing chucks 19 into engagement with assembly 25, FIG. 9, includes a conveyor designated generally as numeral 27, cams 28 and 29 which converge toward the conveyor, and a furnace 31. An upright conveyor portion 32 is provided with a plurality of cradles 33 for support of articles 11 prepared for encapsulation. A pair of opposing chucks 19 are arranged for horizontal translatory movement normal to the longitudinal axis of the conveyor 27 by rods 34 which are slidably engaged to the upturned edges 35 of the conveyor 27. The rods 34 carry at their outer ends shafts 36 which serve as axes for rollers 37 which are in rolling contact with convergent cams 28 and 29 by tension springs 38 attached to the chucks 19 and to the upturned edges 35 of the conveyor, as best shown in FIGS. 11 and 12.

*Operation*

The assembly 25 is placed into the cradle 33 of the conveyor 27 and, as the assembly 25 is carried in the cradle 33 of the conveyor 27 toward the furnace 31, the rollers 37 contact the cams 28 and 29. The rods 34 impart gradual lateral movement to the chucks 19 toward the center of the assembly 25, applying pressure against the closures 17. The lateral movement of the rods 34 relative to the conveyor 27 is such that the passages 23 of the chucks 19 are axially aligned to receive the leads 13 of the article 11.

The vertical positioning of the rods 34 on the edges 35 of the conveyor 27 are adjustable to enable the alignment of the chuck apertures 23 with leads of random-sized articles. On the other hand, the portion 32 of the conveyor is adjustable in height for aligning leads with the chuck apertures 23.

A modification of the encapsulated article includes a spacer washer, not shown, which is placed over leads of an article 11 and supports the article from contact with the inner walls 16 of the encapsulating shell 14. One side of the washer abuts the ends of the article 11 and the other side may be in contact with the end closures 17 of the assembly 25. Alternately, the washer frictionally engages the inner surface of the shell 14 and is spaced from the ends of the article 11. The article 11 is held freely within the shell 14 by the connection of the spacer washer with the leads, thus separating the article from contaminating materials of the shell 14. The thickness of closures 17 is less when spacer washers are employed since the closures 17 need not fill completely the cavity 15 within the shell 14 to effect encapsulation of the article 11.

The space 26 which exists between the article 11 and inner walls 16 of the shell 14 and between the end caps 12 of the article 11 and the washers, not shown, may be filled with a suitable inert gas or liquid to further prevent deterioration of the article 11.

It is to be understood that the above-described apparatus, method, and encapsulated article are simply illustrative of the application of the principles of the invention. Numerous other arrangements may be readily devised by those skilled in the art which will embody the principles of the invention and fall within the spirit and scope thereof.

What is claimed is:

1. An apparatus for sealing an assembly of an article within an encapsulating material which comprises a conveyor for supporting the assembly along a path, chucks mounted in spaced opposition upon each side of the conveyor and movable into axial engagement with the assembly on the conveyor, each of the chucks comprising an elongated body having a recess within one end thereof and having a resilient pad fitted within the recess for engagement with the assembly, cams positioned in spaced opposition from and converging towards the conveyor and engageable with the chucks to move the chucks into pressure contact with the assembly carried on the conveyor to pressure seal the encapsulating material about the article prior to heat sealing the assembly, and a furnace for heat sealing the assembly located along the path of travel of the conveyor, the cams extending into and converging towards the furnace whereby the chucks pressure seal the assembly until the heat sealing is accomplished.

2. The method of encapsulating an article having leads protruding therefrom which comprises the steps of inserting the article within a tubular shell of thermosetting plastic material such that the article leads protrude from the shell ends, positioning a preformed closure of uncured plastic material into each of the shell ends with the article leads extending through the closures, positioning pressure and heat-expandable pads in engagement with the closure, applying increasing pressure to heat-expandable pads that engage the closures to pressure seal the article within the closures and the shell, applying heat to the pads to expand the pads thereby further pressure sealing the article within the closures and the shell, and applying heat to the closures and the shell material to cure the material while the article is pressure-sealed within the closures and the shell.

3. An apparatus for gripping and conveying an assembly comprising an advancing conveyor, said conveyor having a pair of upturned edges, each of said upturned edges having a pair of apertures formed therein, said conveyor having a cradle projecting from the center thereof for receiving said assembly, a pair of cylindrical elongated bodies having axial bores with counterbores therein, a resilient pad mounted within each of said counterbores of said bodies and having a passage coaxial with said axial bore of each of said bodies, a pair of rods threadedly mounted in each of said bodies and extending through said pairs of apertures of said upturned edges such that said cylindrical elongated bodies are opposed and positioned between said upturned edges, a spring positioned coaxially about each of said rods and between said upturned edges and said bodies for resiliently urging said bodies towards said edges, a shaft mounted perpendicularly to and on the outer extremities of each of said pairs of rods, a roller coaxially positioned on each of said shafts, a pair of cam tracks positioned in spaced opposition and converging towards said conveyor to engage said rollers to impart lateral movement to said cylindrical bodies as said conveyor is advanced to thereby resiliently grip said assembly.

References Cited in the file of this patent

UNITED STATES PATENTS

| | | |
|---|---|---|
| 1,469,820 | Ruby | Oct. 9, 1923 |
| 2,440,806 | Megow et al. | May 4, 1948 |
| 2,471,592 | Thomson | May 31, 1949 |
| 2,559,943 | Cerny | July 10, 1951 |
| 2,622,133 | Dorst | Dec. 16, 1952 |
| 2,829,756 | Gercke et al. | Apr. 8, 1958 |

FOREIGN PATENTS

| | | |
|---|---|---|
| 219,638 | Australia | Jan. 9, 1959 |
| 62,778 | France | Feb. 9, 1955 |

OTHER REFERENCES

"Electronic Design," Jan. 22, 1958, page 10.